March 26, 1963 R. MARTI 3,082,652
PLIERS AND LIKE TOOLS
Filed May 25, 1960

René Marti
INVENTOR
BY
Karl F. Ross
Agent

United States Patent Office 3,082,652
Patented Mar. 26, 1963

3,082,652
PLIERS AND LIKE TOOLS
René Marti, 18 Rue de Saint-Hippolyte,
Montecheroux, France
Filed May 25, 1960, Ser. No. 31,620
Claims priority, application France July 30, 1959
1 Claim. (Cl. 81—415)

This invention relates in general to hand tools and, more particularly, to pliers and like instruments.

Tools such as pliers, conventionally manufactured by forging or pressing steel blanks, are heavy and relatively expensive to manufacture.

The only important recent improvement in such tools worth pointing out is a partial insulation of the handles, a feature particularly appreciated by electricians.

Other attempts were aimed at producing pliers made either wholly or partially (notably the handles) of synnethic resin, the jaws and/or cutters being made from steel stock. These pliers are relatively light in weight but, in the absence of really hard plastics, the clamping effort applied to the handles is not properly transmitted to the jaws or cutters and therefore these pliers are suitable only for limited uses in which the required clamping force remains within moderate limits.

It is the principal object of this invention to provide improved pliers of heterogeneous constitution capable of mass production at particularly low cost and adapted to provide all the desired properties and characteristics of pliers made completely from forged steel.

The term "pliers" as used herein means all tools having a pair of intersecting arms pivoted to each other and provided with jaws for gripping or cutting any object or material; therefore this term also designates nutcrackers, plug extractors, pruning scissors, shears, etc.

The pliers according to this invention are characterized essentially in that the two arms each include a preferably injection molded shell of thermoplastic or thermosetting resin having imbedded therein a metal core adapted to transmit to the jaws or cutters of the tool the force applied to the opposite ends of the arms whose metallic cores form hubs in the region of their pivotal axis and flat, blade-shaped shanks on the sides of the hubs remote from the jaws; these shanks lie in different axial planes and are flush with the contacting flat faces of the hubs whose plane of contact bisects the surrounding plastic shells.

Other objects and advantages will become apparent from the following description taken in conjunction with the accompanying drawing in which.

Figure 2:
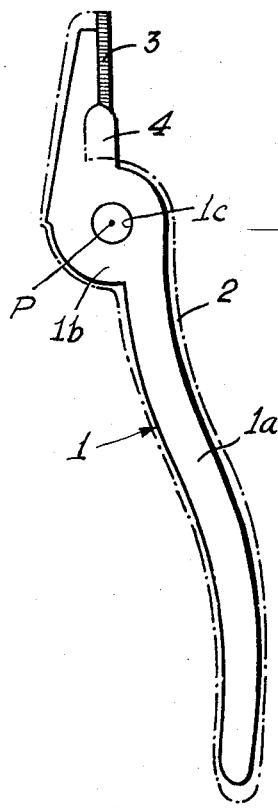
FIGURE 2 is a view similar to FIG. 1 but showing only the metallic core of one arm, with the outline of the surrounding shell indicated in dot-dash lines.

As will be seen from the drawing, the pliers according to this invention comprise two intersecting arms A and B pivoted to each other by means of a rivet or pivot pin C, each arm consisting of a sheet metal core 1 coated with or embedded in a shell 2 of molded synthetic material.

This metal core 1 extends over substantially the entire length of the arms A and B so as to transmit to the operating core portions (clamp jaws 3 and/or cutters 4) the force exerted on the lower or handle portions of these arms.

Figure 3:
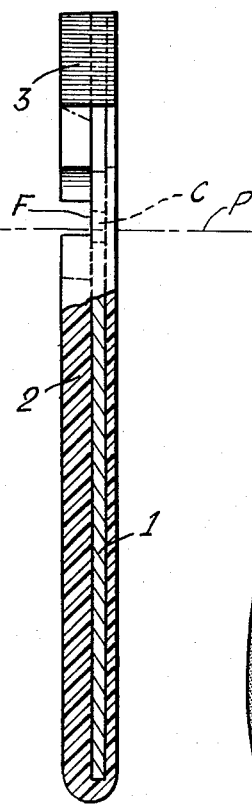
FIGURE 3 is a side view, partly in section, of the arm shown in FIG. 2.
Figure 1:
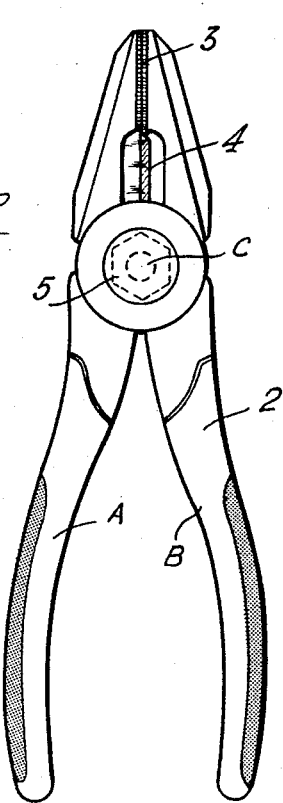
FIGURE 1 is an elevational view illustrating a pair of pliers constructed according to the teachings of this invention.

In the embodiment illustrated in FIGS. 1–3 the cross-sectional shape of the shank portion 1a of this core 1 is rectangular, the major dimension of the rectangle extending in direction transverse to the pivotal axis P so as to be perpendicular to the aforesaid force. It is proposed to cut this core from a steel blank, since this is the most economical solution, but pressing or casting processes may also be used without departing from the scope of the invention. Shank portion 1a is flush with the hub portion 1b which forms a hole 1c accommodating the pivot C. It will be noted that each shell 2 encases the associated core 1 over the major part of its length, including its shank 1a and the outer surface of its hub 1b.

If desired, reinforcing ribs may be formed by pressing or otherwise in the core members. Preferably, the metal constituting these cores will be a ferrous material. The jaws 3 extend at right angles to the major transverse dimension of the blade-shaped part of each core 1.

Figure 4:
FIGURE 4 is a fragmentary view showing a jaw according to a modified embodiment of the invention with the shell again indicated in phantom lines.

Besides, these jaws my either consist of hard-metal plates welded at right angles to the cores (see FIG. 3) or be made by displacing, twisting or otherwise deforming the core metal (see FIG. 4), although injection-molding or other molding methods may be resorted to for this purpose.

As will be seen from FIG. 3 each metal core is offset in relation to the median plane of the corresponding arm, i.e. the plane of the contact faces F of the hubs 1b, so that the two cores may juxtapose themselves at the pivot C without the necessity of a preliminary deformation thereof. This feature is attended by different advantages: thus, it eliminates the step of pressing each metal core which would be necessary if the latter were located in the middle of the plastic shell 2 with formation of the cutters 4 by a simple beveling of confronting aligned edges of these cores at the proper location.

Figure 5:
FIGURE 5 is a view similar to FIG. 4 but showing a further modification.

This relatively offset positioning of the cores reduces considerably the shearing stress transmitted to the assembling rivet or pivot pin C as well as any torsional stress applied to the metal cores at the cutter region. If desired, the two metal cores (see FIG. 5) may be made coplanar, for example with a view to forming cutters 3a registering with each other.

The shell 2 may consist of any suitable synthetic resin such as a polyamid or polystyrene, ureaformol resin, methacrylic resin, lactic resin or any other substance having the same injection or molding properties.

The shell of synthetic resin will not only serve the purpose of giving to the pliers the shape necessary for properly holding and gripping them in the user's hand, but also act as an insulator. To improve this specific function, the rivet or pivot pin C may be concealed under an insulating patch or disc 5.

Thus, the pliers constructed according to the teachings of this invention are light in weight and sturdy, and can be manufactured in large quantities at a relatively low cost.

Although the present invention has been described in conjunction with preferred embodiments, it is to be understood that modifications and variations may be resorted to without departing from the spirit and scope of the invention, as those skilled in the art will readily understand. Such modifications and variations are therefore considered to be within the purview and scope of the invention as defined in the appended claim.

What I claim is:

A tool comprising a pair of intersecting arms and pivot means interconnecting said arms for swinging motion about a common axis; said arms each including a plastic shell and a metallic core imbedded in said shell over the major part of its length; said cores forming respective hubs in the region of said axis with flat faces contacting each other, co-operating jaws on one side of said hubs and flat, blade-shaped shanks on the other side of said hubs, said shanks lying in different planes transverse to said axis and being flush with said flat faces of the respective hubs; said shells being bisected by the plane of contact of said hubs and eccentrically surrounding said shanks with a width more than twice the thickness of said shanks in the direction of said axis, said shells completely encasing said shanks and covering the outer surfaces of said hubs while leaving said jaws at least partly exposed.

References Cited in the file of this patent

UNITED STATES PATENTS

| | | |
|---|---|---|
| 409,097 | Casey | Aug. 13, 1889 |
| 2,023,916 | Dante | Dec. 10, 1935 |
| 2,236,941 | Foley | Apr. 1, 1941 |
| 2,909,954 | Rhoads | Oct. 27, 1959 |

FOREIGN PATENTS

| | | |
|---|---|---|
| 179,785 | Great Britain | May 18, 1922 |
| 425,054 | Italy | Sept. 9, 1947 |